(12) United States Patent
Zou (10) Patent No.: US 9,740,384 B2
(45) Date of Patent: Aug. 22, 2017

(54) MEDIA DEVICE WITH RADIAL GESTURE CONTROL AND METHODS FOR USE THEREWITH

(71) Applicant: Morega Systems Inc., Toronto (CA)

(72) Inventor: Zhifei Zou, Mississauga (CA)

(73) Assignee: MOREGA SYSTEMS INC., Toronto (CA)

( * ) Notice: Subject to any disclaimer, the term of this patent is extended or adjusted under 35 U.S.C. 154(b) by 57 days.

(21) Appl. No.: 14/750,707

(22) Filed: Jun. 25, 2015

(65) Prior Publication Data
US 2016/0378237 A1    Dec. 29, 2016

(51) Int. Cl.
| | |
|---|---|
| *G06F 3/0484* | (2013.01) |
| *G06F 3/041* | (2006.01) |
| *G06F 3/01* | (2006.01) |
| *G06F 3/0485* | (2013.01) |
| *G06F 3/0488* | (2013.01) |

(52) U.S. Cl.
CPC ........ *G06F 3/04847* (2013.01); *G06F 3/0485* (2013.01); *G06F 3/04883* (2013.01); *G06F 2203/04808* (2013.01)

(58) Field of Classification Search
CPC .... G06F 3/041; G06F 3/0416; G06F 3/04847; G06F 3/017; G06F 2203/04104
See application file for complete search history.

(56) References Cited

U.S. PATENT DOCUMENTS

| | | | | |
|---|---|---|---|---|
| 2011/0102464 A1* | 5/2011 | Godavari | .............. | G06F 3/0416 345/650 |
| 2014/0258854 A1* | 9/2014 | Li | .......... | G11B 27/34 715/702 |
| 2014/0267119 A1* | 9/2014 | Im | ........ | G06F 3/0416 345/173 |
| 2016/0196042 A1* | 7/2016 | Laute | ...... | G06F 3/017 715/845 |

* cited by examiner

*Primary Examiner* — Lixi C Simpson
(74) *Attorney, Agent, or Firm* — Garlick & Markison; Bruce E. Stuckman

(57) ABSTRACT

In accordance with one or more embodiments, a media device includes a radial gesture controller configured to identify a plurality of contemporaneous user touchpoints of a touch screen, and to generate radial gesture control data that includes a radial distance between a first of the plurality of contemporaneous user touchpoints about a second of the plurality of contemporaneous user touchpoints and an angular deviation of a first of the plurality of contemporaneous user touchpoints about a second of the plurality of contemporaneous user touchpoints. The radial gesture control data is used to generate control data, such as linear media control data for controlling a media player based on the radial distance and the angular deviation. Other embodiments are disclosed.

15 Claims, 6 Drawing Sheets

MEDIA DEVICE WITH RADIAL GESTURE CONTROL AND METHODS FOR USE THEREWITH

TECHNICAL FIELD OF THE DISCLOSURE

The present disclosure relates to control of media devices having a touch screen interface.

DESCRIPTION OF RELATED ART

Mobile devices are becoming a ubiquitous presence in the home, office and wherever else users happen to be. Many mobile devices, such as smart phones, netbooks, notebooks and tablet personal computing devices include a touch screen interface that allows the user to control the various functions of the device. These mobile devices have become powerful tools that can provide voice and text communication, still and video photography, document reading and creation and are capable of viewing audio and video programming, either through the use of a television tuner card, or via streaming video thru either free or subscriptions services.

The limitations and disadvantages of conventional and traditional approaches will become apparent to one of ordinary skill in the art through comparison of such systems with the present disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION OF THE DISCLOSURE INCLUDING THE PRESENTLY PREFERRED EMBODIMENTS

Figure 1:
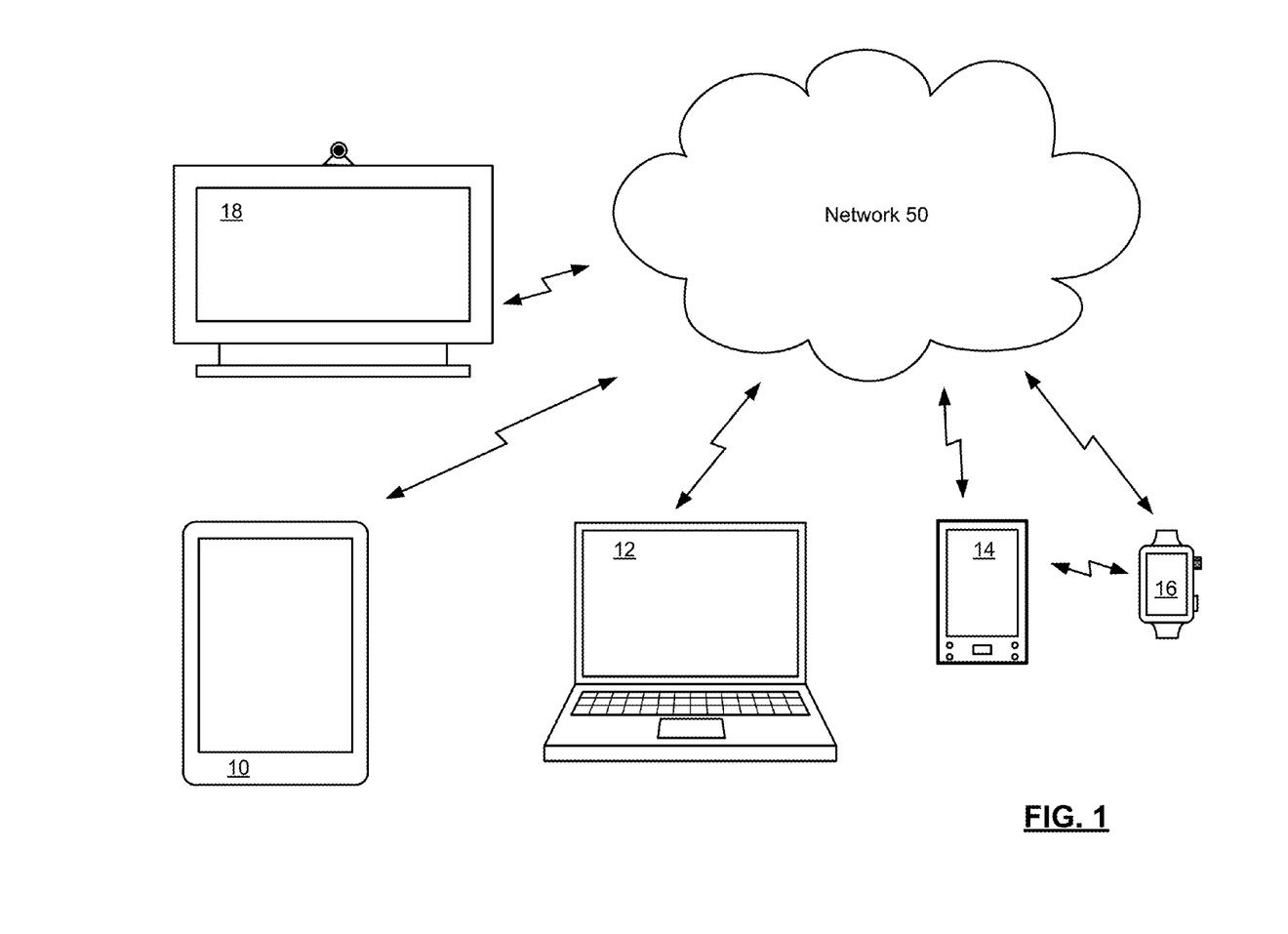
FIG. 1 presents a pictorial representation of media devices in accordance with various embodiments of the present disclosure.

FIG. 1 presents a pictorial representation of media devices in accordance with various embodiments of the present disclosure. A tablet 10, person computer 12, smartphone 14, smart watch 16, virtual reality system are examples of media devices having touch screen interfaces or other two-dimensional (2D) or three-dimensional (3D) gesture recognition that operate in conjunction with one or more radial gesture control features of this disclosure.

A network 50 is coupled to communicate data such as streaming media, media files, other media content and/or other data with the tablet 10, person computer 12, smartphone 14 and smart watch 16 via a wireless local area network (WLAN) connection, 4G or higher cellular data connection, a wired network connection such as an Ethernet, Firewire or universal service bus (USB) connection or other network connection. The network 50 can be a wireless or wired data network, local area network, wide area network, metropolitan area network and/or the Internet. While the various media devices are shown as communicating with network 50, each of these devices can further communicate with one another, such as on a peer-to-peer basis, via a short range wireless connection such as a wireless local area network connection, personal area network, near field communications or other short range wireless links.

Each of the media devices shown are capable of generating, displaying and/or editing media content. The media content can be in the form of one or more video signals, audio signals, text, games, multimedia signals or other media signals that are either streaming signals such as real-time signals in analog or digital format or data files that contain media content in a digital format. Many such applications, as well as other device operations, require scrolling, scrubbing, browsing through timelines, and/or adjusting settings via a linear control element such as a scroll bar, scrub bar, slide bar or other linear control mechanism that operates via the touch screen or other 2D or 3D gesture recognizer of the device. It is often difficult to perform these actions at different scales for both course and fine control, especially on a touch screen where the precision offered by desktop mouse or other pointing device does not exist.

Consider an example where a user is watching a video on a small mobile device via a media player that includes a linear scrub bar. If the content is very long, then it can be a challenge for user to use the scrub bar to accurately navigate to a desired location in the video—particularly when a fine position adjustment is required, such as to make only a slight forward or backward scrub from the current position or when a user wishes to find a precise location in the video. The media devices in accordance with the present disclosure use one or more radial gesture control features to address this issue with respect to control elements such as linear control elements and other controls.

While particular examples of media devices are shown, one or more radial gesture control features of this disclosure likewise can be applied to other media devices that include touch screen interfaces or other 2D or 3D gesture recognizer such as an e-reader, netbook, portable game player, alternative reality system, arcade game, or other media device. Further details regarding the radial gesture control features including various embodiments, optional implementations, functions and features are presented in conjunction with FIGS. 2-10 that follow.

Figure 2:
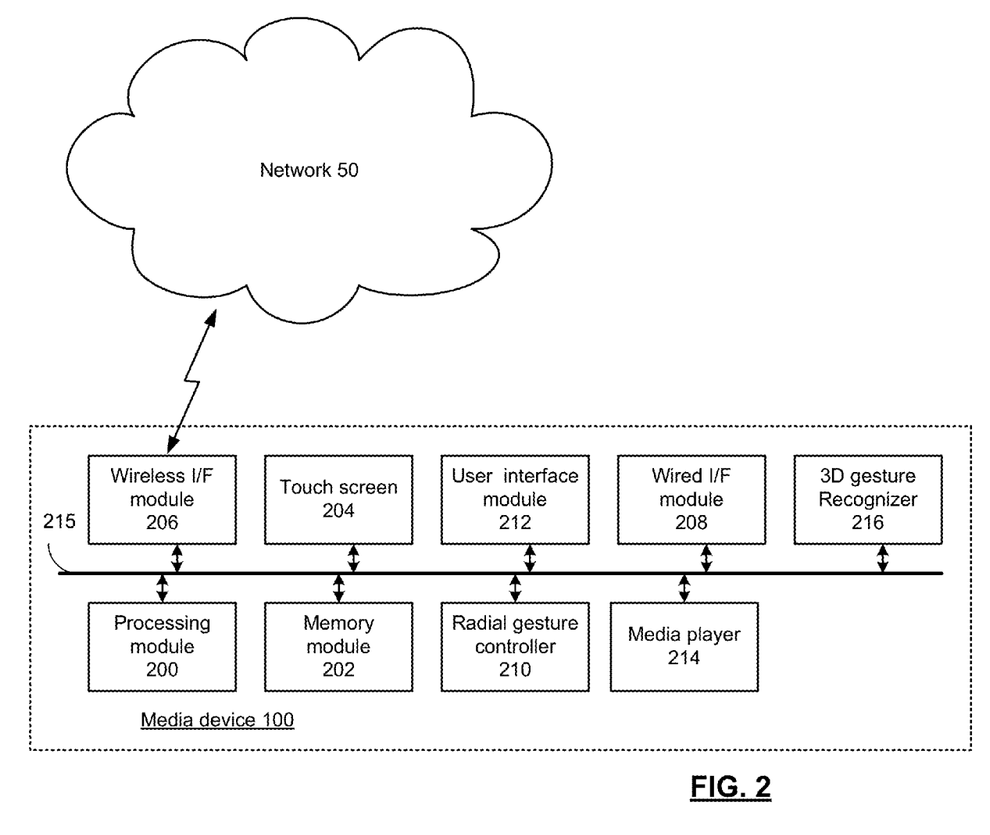
FIG. 2 presents a block diagram representation of a media device in accordance with various embodiments of the present disclosure.

FIG. 2 presents a block diagram representation of a media device in accordance with various embodiments of the present disclosure. In particular, a media device 100, such as any of the media devices described in conjunction with FIG. 1, is shown. The media device 100 includes a processing module 200, memory module 202, touch screen 204, wireless interface module 206, wired interface module 208, radial gesture controller 210, media player 214, 3D gesture recognizer 216 and user interface module 212 that are interconnected via bus 215.

Processing module 200 controls the operation of the media device 100 and/or provides processing required by other modules of the media device 10. Processing module 200 can be implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module 200 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus structures are shown, other architectures, including the use of additional busses and/or direct connectivity between elements are likewise possible.

Wired interface module 208 can operate via a wired link for communicating media content and other data to and from a network such as network 50 and/or with other devices. The wired interface module 208 can include an Ethernet connection, Universal Serial Bus (USB) connection, an Institute of Electrical and Electronics Engineers (IEEE) 1394 (Firewire) connection, small computer serial interface (SCSI) connection, a composite video, component video, S-video, analog audio, video graphics array (VGA), digital visual interface (DVI) and/or high definition multimedia interface (HDMI) connection or other wired connection that operates in accordance with either a standard or custom interface protocol. Wireless interface module 208 can also communicate media content or other data via a wireless link that operates in accordance with a wireless network protocol such as 802.11a,b,g,n,ac, etc. (referred to generically as 802.11x), Ultra Wideband (UWB), 4G or higher cellular data link, Bluetooth, ZigBee, Infrared Data Association (IrDA) or other wireless connection that operates in accordance with either a standard or custom interface protocol.

The user interface module, 212 can include one or more buttons or switches, soft keys, a remote control device, such as an infrared or other wireless and remote control interface that communicates with the remote control device, a graphical user interface, in addition to other devices and drivers that allow the user to interact with the media device 100. The touch screen 204 can include a liquid crystal display, light emitting diode display or any other display that creates an optical image stream either directly or indirectly, such as by optical transmission or projection, and that further includes a touch surface, such as a capacitive, resistive, inductive or other touch surface capable of resolving a plurality of contemporaneous touchpoints of a user via a stylus, a direct touch or near user touch and further that generates touch data in response to these touchpoints by, for example, their coordinates. The 3D gesture recognizer 216 can include one or more a proximity sensors, imaging devices, a wearable sensor array that is included in a glove in conjunction with that analyzes sensor and/or imaging data to generate finger positions of a user in order to resolve positions of the index finger and thumb and/or to recognize a radial hand gesture in 2D or 3D. While shown separately touch screen 204 and 3D gesture recognizer can be incorporated in the same device or share one or more common components.

On operation, processing module 200 executes one or more applications, an operating system, together with one or more drivers and utilities that perform the various functions of the device. The media player 214 can be a standalone device or one or more such applications or utilities that operate in conjunction with the touch screen 204 to present audio, video or other media. In examples where media device 100 is an Apple iPhone, iPad or similar device, the media player 214 can be an 'app" that is downloaded to the device from a remote server via network 50, selected from a main menu and executed in response to commands from the user. The media player 214 can similarly be an Android or Microsoft application downloaded and used in conjunction with other compatible devices. The media player 214 can otherwise be implemented via other software or firmware. Examples of the media player 214 can include an audio player, video player, or other programs that present or display media such as a browser, document viewer, email program, voicemail interface, or other program that presents either linear media that can be scrubbed to select a position in the media, that presents multiple instances of media that can be selected via scrolling, or that otherwise presents other controls that can be adjusted based on control data.

The radial gesture controller 210 implements one or more radial gesture control features. In particular, the radial gesture controller 210 is configured to perform the following steps:

(a) Analyze touch data from the touch screen 204 or gesture data from a 3D gesture recognizer 216 to generate radial gesture control data; and (b) Convert the radial gesture control data to control data, such as linear media control data.

For example, the radial gesture control data includes a radial distance between a first of the plurality of contemporaneous user touchpoints and a second of the plurality of contemporaneous user touchpoints and an angular deviation of a first of the plurality of contemporaneous user touchpoints about a second of the plurality of contemporaneous user touchpoints.

This combination of radial distance and angular deviation can be converted to control data for adjusting or otherwise controlling one or more functions of the media player 214 and/or other functions of the media device 100. Considering the radial distance to be represented by r and the angular deviation to be represented by $\Delta\theta$, control data $\Delta C$ can be generated as:

$$\Delta C = f(r, \Delta\theta)$$

where $f$ is a predefined function.

While the foregoing has focused on radial gesture control based on touchpoints identified via a touch screen 204, in another example, the radial gesture control data includes a radial distance between a first of the plurality of contemporaneous 3D user finger positions and a second of the plurality of contemporaneous 3D user finger positions and an angular deviation of a first of the plurality of contemporaneous 3D user finger positions about a second of the plurality of contemporaneous 3D user finger positions. The radial gesture controller 210 can convert the radial gesture control data to linear media control data in order to generate adjustments to the linear media control data that are based on the radial distance and the angular deviation. In this fashion, 2D or 3D finger positions identified via a 3D gesture recognizer 216 could be used in a similar fashion to generate the values of (r, Δθ) described above.

In various embodiments, the radial gesture controller 210 can be implemented via a processor or other hardware. While shown separately from touch screen 204, media player 214 and processing module 200, the radial gesture controller 210 can be implemented as a driver of touch screen 204, as a routine included in media player 214, in operational instructions executed by processing module 200, via other hardware, software or firmware or any combination thereof Other examples of the operation of the radial gesture controller 210, including several optional functions and features are presented in conjunction with FIGS. 3-10 that follow.

Figure 3:
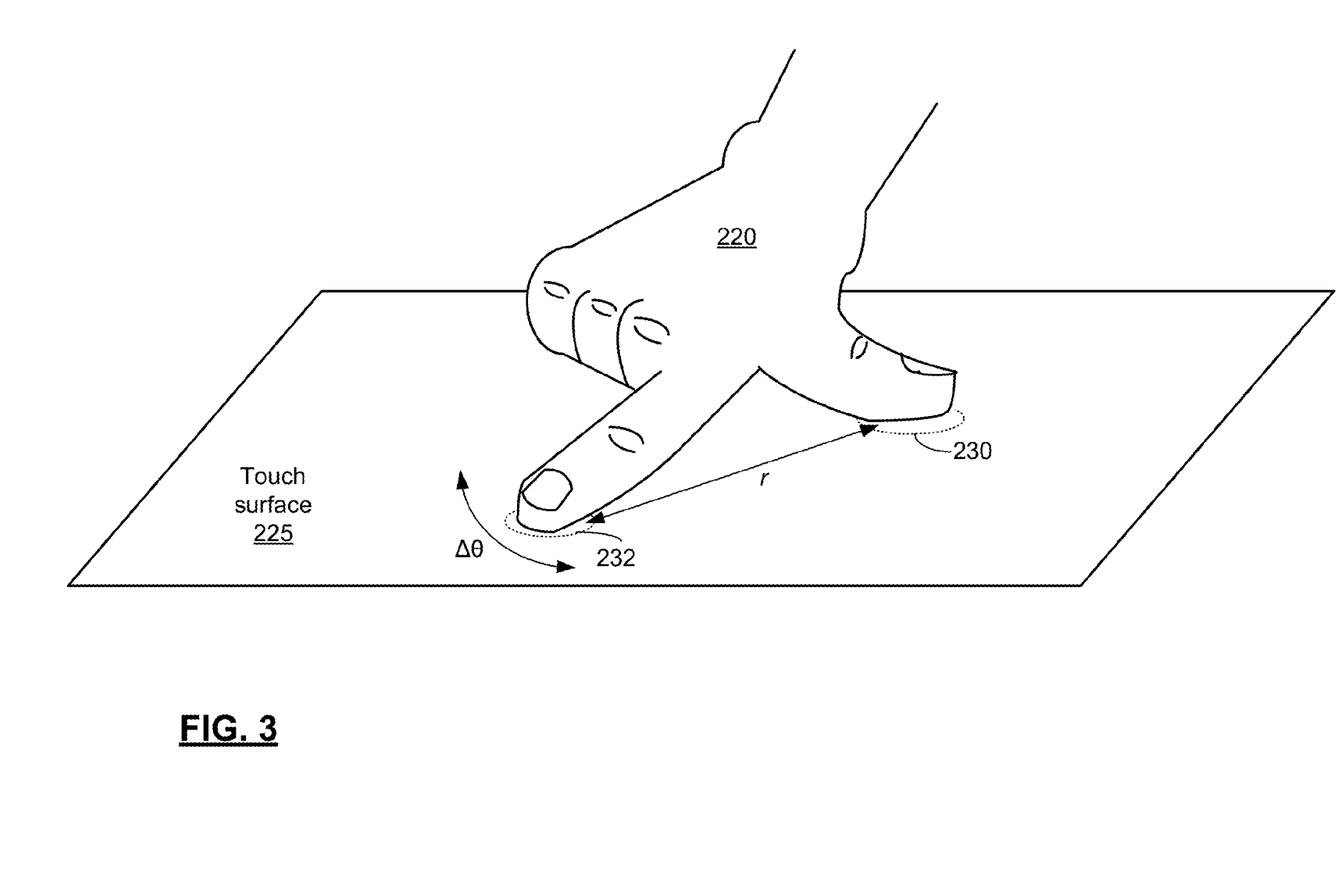
FIG. 3 presents a pictorial representation of a touch surface in accordance with various embodiments of the present disclosure.

FIG. 3 presents a pictorial representation of a touch surface in accordance with various embodiments of the present disclosure. In particular, a touch surface 225 of a touch screen, such as touch screen 204, is presented. As shown, user 220 creates touchpoints 230 and 232 via the user's thumb and index finger that are recognized by the touch screen and used to generate touch data. This touch data can be analyzed by the radial gesture controller 210 to generate the radial gesture control data.

In the example shown, the radial distance between the touchpoints r can be varied to provide one control variable. In addition, the angular deviation Δθ can be varied by the user pivoting his or her hand about the touchpoint 230 of the thumb, to provide a second axis of control and thus, a second independent control variable.

$$\Delta C = f(r, \Delta\theta)$$

This radial control feature can be used to provide more sensitive adjustment of a linear control element such as a scroll bar, scrub bar, slide bar or other linear element. For example, the radial distance r can be used to adjust a sensitivity or gain of the control set by the angular deviation Δθ as follows:

$$\Delta C = r\Delta\theta$$

In this fashion, control data ΔC can be generated to make small/fine adjustments by the user moving the touchpoint 232 closer to the touchpoint 230, such as by pinching their fingers together and then pivoting the index finger about the thumb to create and angular deviation Δθ. Similarly, control data ΔC can be generated to make larger/coarser adjustments by the user having his or her hand spread as shown. In particular, a constant angular deviation Δθ generates larger values of control data ΔC when a larger radial distance r is employed.

Consider the example where the media player 214 generates media data for display of media content via the touch screen 204 in accordance with a linear control element such as a scroll bar, scrub bar, slide bar or other linear element that operates via linear media control data. Consider further that the linear media control data includes a control parameter x, that satisfies the following inequality constraints.

$$x_{min} \leq x \leq x_{max}$$

where $x_{min}$ represents a minimum value of x and $x_{max}$ represents a maximum value of x. While user touchpoints may be used to adjust the value of x based on direct interaction with the scroll bar, scrub bar, slide bar or other linear element, radial gesture control can be used to provide more accurate control. The value of x can adjusted up or down by an amount Δx based on the radial gesture control data, based on $$\Delta x = f(r, \Delta\theta)$$

Following along with the example above where the radial distance is used to adjust a sensitivity or gain of the control set by the angular deviation:

$$\Delta x = kr\Delta\theta$$

where k is a proportionality constant. For positive values of k, pivoting the index finger clockwise generates positive angular deviations Δθ that create positive adjustments Δx to the linear control. Conversely, pivoting the index finger counterclockwise generates clockwise generates negative angular deviations Δθ that create negative adjustments Δx to the linear control. Larger values of r generate larger adjustments Δx than smaller values of r for the same angular deviation Δθ. For negative values of k, pivoting the index finger counterclockwise generates positive angular deviations Δθ that create positive adjustments Δx to the linear control. Conversely, pivoting the index finger clockwise generates clockwise generates negative angular deviations Δθ that create negative adjustments Δx to the linear control. As before, larger values of r generate larger adjustments Δx than smaller values of r for the same angular deviation Δθ.

The value of k can be determined in order to provide the desired range of coarse or fine adjustment based on the expected largest or smallest values of r and Δθ that reflect the largest and smallest spread of fingers, the size of the display and expected biophysical limitations on how a hand, arm and fingers can rotate. While some people may be physically capable of executing a pivoting motion with their thumb and index finger that spans 360 degrees or more, most people would only be comfortable with smaller radial spans. Smaller screen displays might further limit the maximum values of both Δθ and r.

Consider a case where:

$$r_{min} \leq r \leq r_{max}$$

and, $$-\Delta\theta_{max}/2 \leq \Delta\theta \leq \Delta\theta_{max}/2$$

The value of k can be set to allow full adjustment over the entire range of the control parameter x by setting $$k = (x_{max} - x_{min})/r_{max}\Delta\theta_{max}$$

and further constraining setting the Δx as follows:

$$if \Delta x > x_{max}, then \Delta x = x_{max}$$

and $$if \Delta x < x_{min}, then \Delta x = x_{min}$$

It should be noted that once the value of k is fixed. The value of r can place limits on the range of adjustment. Consider again the case where $$k = (x_{max} - x_{min})/r_{max}\Delta\theta_{max}$$

$$\Delta x = kr\Delta\theta$$

$$r_{min} \leq r \leq r_{max}$$

and, $$-\Delta\theta_{max}/2 \leq \Delta\theta \leq \Delta\theta_{max}/2$$

When $r=r_{max}$, $\Delta x$ can be adjusted anywhere in the range of:

$$-(x_{max}-x_{min})/2 \leq \Delta x \leq (x_{max}-x_{min})/2$$

In this fashion, if the control value of x is initially $x_{init}$ at the midpoint between $x_{max}$ and $x_{min}$, then variations between $\Delta\theta_{max}/2 \leq \Delta\theta \leq \Delta\theta_{max}/2$ generate values of $$x=x_{init}+\Delta x, \text{ where}$$

$$x_{min} \leq x \leq x_{max}$$

Meaning that the control value can be adjusted over the maximum span of the control parameter x. If however, the value of r is reduced to $r=r_{max}/2$, then the range of adjustment is limited to $$-(x_{max}-x_{min})/4 \leq \Delta x \leq (x_{max}-x_{min})/4$$

and the adjustment range is limited to half the maximum span of x.

It should be noted that while a particular function of $f(r, \Delta\theta)$ is disclosed above, other functions can be used as well. For example, $$\Delta x = k\Delta\theta/r$$

As in the prior function, for positive values of k, pivoting the index finger clockwise generates positive angular deviations $\Delta\theta$ that create positive adjustments $\Delta x$ to the linear control. Conversely, pivoting the index finger counterclockwise generates clockwise generates negative angular deviations $\Delta\theta$ that create negative adjustments $\Delta x$ to the linear control. In contrast to the prior function, larger values of r generate smaller adjustments $\Delta x$ than smaller values of r for the same angular deviation $\Delta\theta$.

While the foregoing has focused on the use of the radial distance as a gain or sensitivity, other functions can be employed as well. For example, the radius of the gesture can also be used to control other variables associated with controls in a two dimensional fashion. For example, different quantized radiuses, can be used select file, folders or other types or media to browse. In another example, content can be navigated by size, color, name or other different content variables etc, via different radiuses.

Consider a class of objects characterized by n different types $(T_1, T_2, \ldots T_n)$ and for a given type $T_i$, having different objects $(s_1, s_2, \ldots)$. A particular object of a particular type can be selected based on:

$$T=g(r)$$

And, $$s=h(\Delta\theta)$$

where g and h are functions, such as discrete functions that translate different ranges to particular discrete values.

In this fashion, a particular object $s_j$ of type $T_i$ can be selected based on the values of $\Delta\theta$ and r. Consider an example where gesture control features are used to select a program to watch. A small value of r may correspond to television shows and a larger value of r may correspond to movies and values of $\Delta\theta$ can be used to browse through the collections of whatever type is selected, based on the value of r.

It should be noted that while the foregoing has discussed the use of the thumb and index finger for generating the contemporaneous touchpoints or a radial gesture, the use of any two fingers, two touchpoints or radial gestures generated in any other fashion, could likewise be employed.

Figure 4:
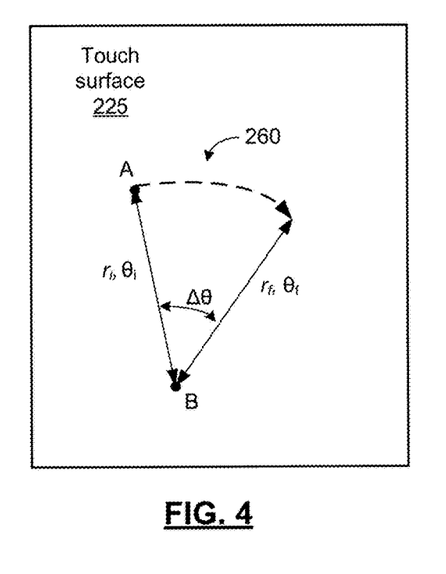
FIG. 4 presents a graphical representation of a touch screen trajectory in accordance with various embodiments of the present disclosure.

FIG. 4 presents a graphical representation of a touch screen trajectory in accordance with various embodiments of the present disclosure. As a user interacts with touch screen, such as touch screen 204, touch data is generated that represents the coordinates of the corresponding touchpoints. If the user moves the touchpoints, this motion generates touch data that tracks the trajectory of the touchpoints that can be used by the radial gesture controller 210 to generate the radial gesture control data in response.

In the example shown, two contemporaneous touchpoints are represented by A and B in conjunction with an interaction by the user in conjunction with a radial gesture control feature. While touchpoint B remains stationary, touchpoint A moves along a path 260 until the user lifts her or her fingers from the touch screen. The path 260 of touch point A pivots about the touchpoint B from an initial angle $\theta_i$ and radial distance $r_i$ to a final angle $\theta_f$ and radial distance $r_f$ creating an angular deviation $\Delta\theta$ that changes with time along the path 260. For a perfect pivot, the radial distance remains constant and $r_i=r_f$, in most scenarios however, the radial distance r may change at least slightly over the path of touch point A. In an embodiment, the radial gesture controller 210 continually analyzes the touch data in accordance with the path 260 to generate values of r and $\Delta\theta$. In the example shown, with the value of r runs from $r_i \to r_f$ and $\Delta\theta$ runs from $0 \to \theta_f - \theta_i$.

In the example shown the path 260 moves only in one direction (clockwise) and with relatively little variation in r. In other examples however, the radius r may vary as the user selects a desired sensitivity. In addition, the path of touch point A may move back and forth, for example, as the user homes in on a particular desired adjustment. Consider an example where the control data is linear media control data that controls a scroll bar for scrolling through particular media being displayed by the touch screen. Because the control data is being continuously generated along the path, adjustments can be made continuously resulting in continuous scrolling that the user observes and uses as visual feedback to scroll to the particular point the user desires.

It should be noted that while the touchpoint B is shown as being stationary over the pivot, it is possible that the touchpoint B also moves slightly. Small variations in the position of B can be ignored by the radial gesture controller 210. In some embodiments however, the magnitude of the positional deviation of B can also be tracked and compared to a threshold. If the magnitude exceeds the threshold, indicating, for example, that the touchpoints A and B do not represent a proper pivot, then the generation of control data can be discontinued by the radial gesture controller 210 without generating further radial gesture control in response to this particular user interaction.

Figure 5:
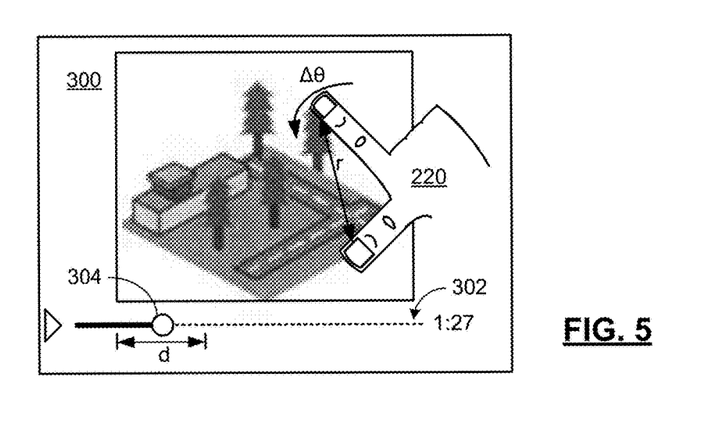
FIG. 5 presents a pictorial representation of a screen display in accordance with various embodiments of the present disclosure.

FIG. 5 presents a pictorial representation of a screen display in accordance with various embodiments of the present disclosure. In particular, a screen display 300 is shown of a touch screen, such as touch screen 204, that is playing a video.

In this example, the scrub bar 302 represents a linear media control element that is displayed contemporaneously with the video on the touch screen. In particular, the scrub bar 302 includes an indicator 304 that operates under control of linear media control data to indicate the current playback position in the video. While the video is playing normally, the linear media control data is incremented in conjunction with the playback. The scrub bar 302 is independently controllable via linear touch interaction by the user 220, for example, by dragging the indicator back and forth to scrub the video to different locations within the video program. In the example shown however, the user 220 interacts with the touch screen to implement a radial control feature as previously described.

The radial distance r sets an adjustment sensitivity of the linear media control data generated by the indicator 304, and the radial distance sets an adjustment position of the indicator 304 in accordance with the adjustment sensitivity. In this fashion, variations in radial distance r can be used to control how coarse or how fine the indicator 304 is to be adjusted. For example, the radial distance r can be used to establish an adjustment range d of the indicator 304 of the scrub bar 302, and the radial distance $\Delta\theta$ can set an adjustment position of the indicator 304 of the scrub bar 302 within the adjustment range. In particular, the user 220 has generated two touchpoints with his or her index finger and thumb and is about to pivot his or her index finger counterclockwise about the thumb to adjust the indicator 304 backwards within the adjustment range d.

Figure 6:
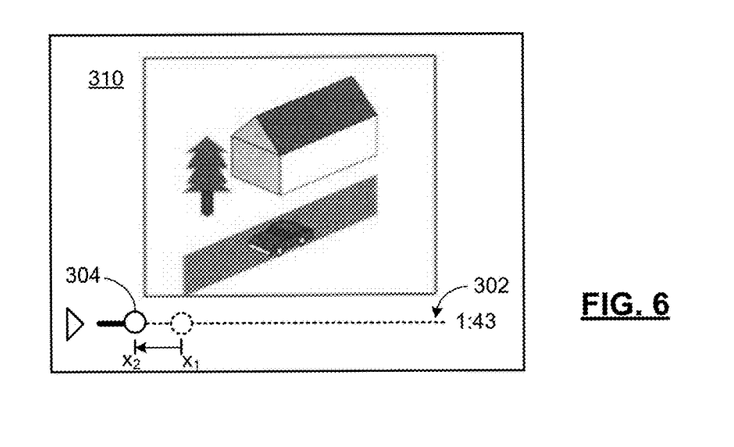
FIG. 6 presents a pictorial representation of a screen display in accordance with various embodiments of the present disclosure.

FIG. 6 presents a pictorial representation of a screen display in accordance with various embodiments of the present disclosure. In particular, a screen display 310 is shown that follows the radial gesture control example presented in FIG. 5. In this case, the user 220 has already generated touch points by pivoting his or her index finger counterclockwise about the thumb to adjust the scrub bar 302 and removed his or her hand. The indicator 304 has moved from its prior position $x_1$ to a new position $x_2$ that scrubs the video playback backward to an earlier position, for example, to play portions of the video that have previously been played.

Figure 7:
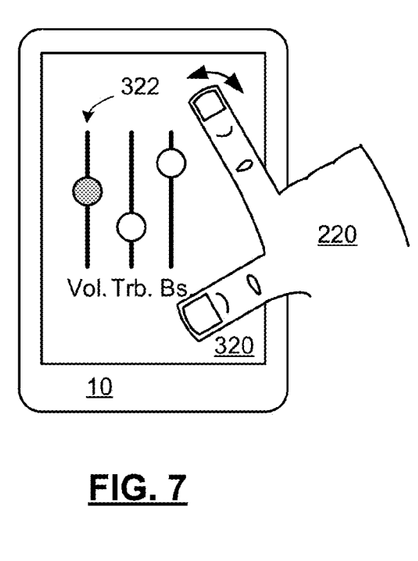
FIG. 7 presents a pictorial representation of a screen display in accordance with various embodiments of the present disclosure.

FIG. 7 presents a pictorial representation of a screen display in accordance with various embodiments of the present disclosure. In particular a screen display 320 is shown corresponding to a tablet 10. While the example presented in conjunction with FIGS. 5 and 6 presented the radial gesture control of a scrub bar, this example shows a plurality of vertical slide bars that are used to control the volume as well as treble and bass settings for an audio player. The user 320 has selected the volume control for adjustment by previously tapping the corresponding slide bar. The volume slide bar 322 is highlighted in response as shown. The user 220 can now pivot his or her index finger to adjust the volume up and down with a sensitivity set by the radial distance between the finger and thumb.

Figure 8:
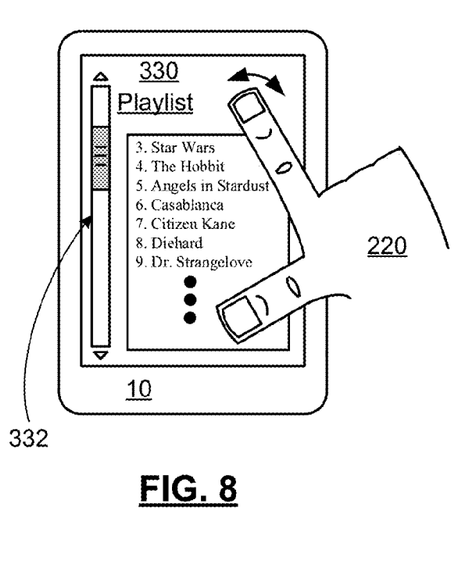
FIG. 8 presents a pictorial representation of a screen display in accordance with various embodiments of the present disclosure.

FIG. 8 presents a pictorial representation of a screen display in accordance with various embodiments of the present disclosure. In particular a screen display 330 is shown corresponding to a tablet 10. In this example, radial gesture control by the user 220 is used to adjust the scroll bar 332 to scroll through titles on a playlist.

Figure 9:
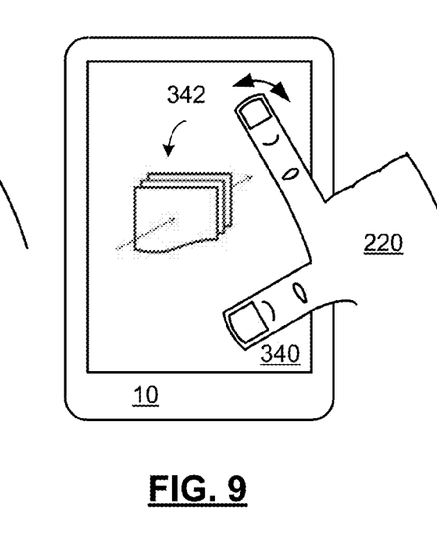
FIG. 9 presents a pictorial representation of a screen display in accordance with various embodiments of the present disclosure.

FIG. 9 presents a pictorial representation of a screen display in accordance with various embodiments of the present disclosure. In particular a screen display 340 is shown corresponding to a tablet 10. In this example, radial gesture control by the user 220 is used to browse through a large selection of items 342 such as files, programs, documents, movies, audio tracks, webpages or other media elements. For example, the items 342 can be channels, video on demand selections or programs presented in conjunction with an electronic program guide that can be navigated by the user in order to select a particular channel, video on demand selection or a program to watch.

It should be noted that the particular examples presented in conjunction with FIGS. 5-9 are merely illustrative of the many possible ways that the radial gesture control features of a media device can be implemented to generate radial gesture control data that can be used to control linear media control elements such as scrub bars, scroll bars, slide bars or implement a broader range of control features for a device, such as media device 100.

Figure 10:
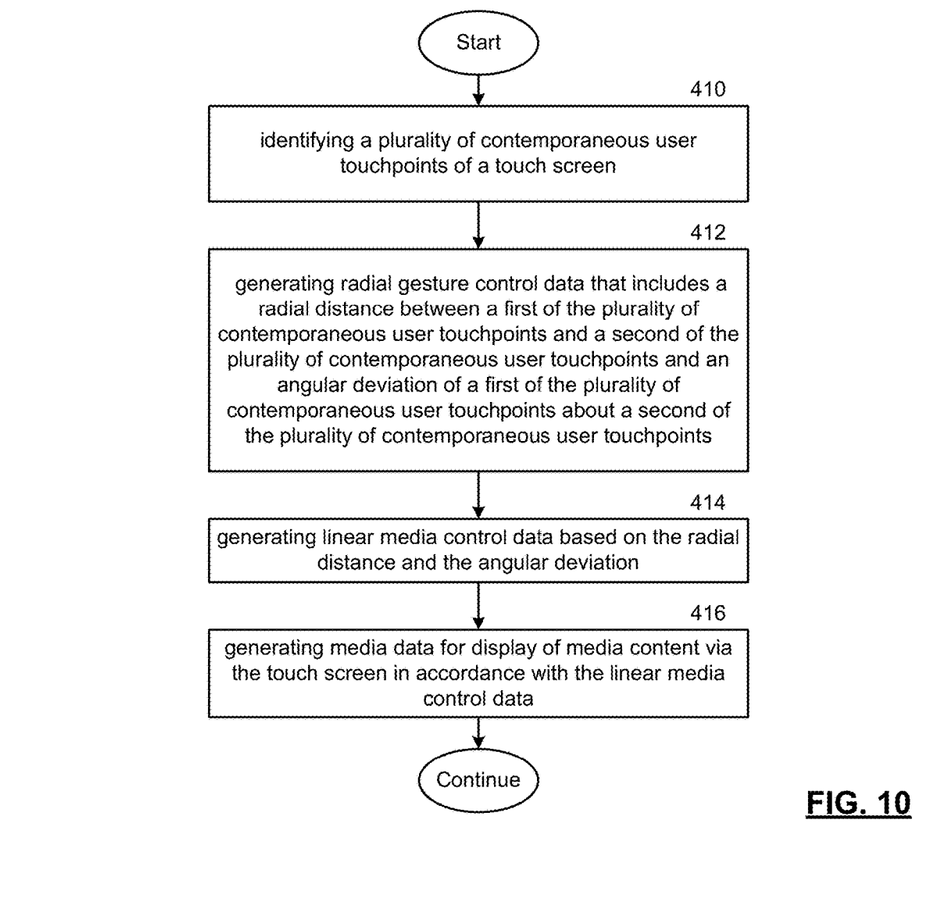
FIG. 10 presents a flowchart representation of a method in accordance with various embodiments of the present disclosure.

FIG. 10 presents a flowchart representation of a method in accordance with various embodiments of the present disclosure. In particular, a method is presented for use with one or more functions and features described in conjunction with FIGS. 1-9. Step 410 includes identifying a plurality of contemporaneous user touchpoints of a touch screen. Step 412 includes generating radial gesture control data that includes a radial distance between a first of the plurality of contemporaneous user touchpoints and a second of the plurality of contemporaneous user touchpoints and an angular deviation of a first of the plurality of contemporaneous user touchpoints about a second of the plurality of contemporaneous user touchpoints. Step 414 includes generating linear media control data based on the radial distance and the angular deviation. Step 416 includes generating media data for display of media content via the touch screen in accordance with the linear media control data.

In various embodiments, display of the media content is controlled via a linear media control element displayed contemporaneously on the touch screen with the media content. The linear media control element can operates under control of the linear media control data. The linear media control element can be independently controllable via linear touch interaction with linear media control element. For example, the media content can include video content and the linear media control element can be a scrub bar. The radial distance can set an adjustment range of the scrub bar, and the radial distance sets an adjustment position of the scrub bar within the adjustment range. The second of the plurality of contemporaneous user touchpoints can correspond to a pivot point and the first of the plural the angular deviation can represents a pivoting of the first of the plurality of contemporaneous user touchpoints about the pivot point.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A media device comprising:
   a touch screen that generates touch data indicating a plurality of contemporaneous user touchpoints of the touch screen;
   a media player configured to generate media data for display of media content via the touch screen in accordance with linear media control data; and
   a radial gesture controller configured to analyze the touch data to generate radial gesture control data that includes a radial distance between a first of the plurality of contemporaneous user touchpoints and a second of the plurality of contemporaneous user touchpoints and an angular deviation of the first of the plurality of contemporaneous user touchpoints about the second of the plurality of contemporaneous user touchpoints, and to generate adjustments to the linear media control data based on the radial distance and the angular deviation wherein the radial distance sets an adjustment range of the linear media control data, wherein the magnitude of the adjustment range is a function of the radial distance, wherein the angular deviation sets an adjustment position within the adjustment range, and wherein the magnitude of an adjustment deviation of the linear control data between the adjustment position and a previous position is proportional to the product of the radial distance and the angular deviation.

2. The media device of claim 1 wherein the media player controls display of the media content via a linear media control element displayed contemporaneously on the touch screen with the media content, and wherein the linear media control element operates under control of the linear media control data.

3. The media device of claim 2 wherein linear media control element is independently controllable via linear touch interaction with linear media control element.

4. The media device of claim 2 wherein the media content includes video content and the linear media control element includes a scrub bar, wherein the first of the plurality of contemporaneous user touchpoints and the second of the plurality of contemporaneous user touchpoints correspond to points of the touch screen that include the video content.

5. The media device of claim 4 wherein the radial distance sets an adjustment range of the scrub bar, wherein the magnitude of the adjustment range of the scrub bar is a function of the radial distance, and wherein the angular deviation sets an adjustment position of the scrub bar within the adjustment range.

6. The media device of claim 2 wherein the linear media control element includes one of: a scroll bar or a linear slide control.

7. The media device of claim 1, wherein the magnitude of the adjustment range is proportional to the radial distance.

8. The media device of claim 1 wherein the radial distance sets an adjustment sensitivity of the linear media control data, wherein the adjustment range is set in accordance with the adjustment sensitivity, and wherein the angular deviation sets an adjustment position in accordance with the adjustment sensitivity.

9. The media device of claim 1 wherein the second of the plurality of contemporaneous user touchpoints corresponds to a pivot point and the angular deviation represents a pivoting of the first of the plurality of contemporaneous user touchpoints about the pivot point.

10. A method comprising:
    identifying a plurality of contemporaneous user touchpoints of a touch screen;
    generating radial gesture control data that includes a radial distance between a first of the plurality of contemporaneous user touchpoints and a second of the plurality of contemporaneous user touchpoints and an angular deviation of the first of the plurality of contemporaneous user touchpoints about the second of the plurality of contemporaneous user touchpoints;
    generating linear media control data based on the radial distance and the angular deviation wherein the radial distance sets an adjustment range of the linear media control data, wherein the magnitude of the adjustment range is a function of the radial distance, wherein the angular deviation sets an adjustment position within the adjustment range, and wherein the magnitude of an adjustment deviation of the linear control data between the adjustment position and a previous position is proportional to the product of the radial distance and the angular deviation; and
    generating media data for display of media content via the touch screen in accordance with the linear media control data.

11. The method of claim 10 wherein display of the media content is controlled via a linear media control element displayed contemporaneously on the touch screen with the media content, and wherein the linear media control element operates under control of the linear media control data.

12. The method of claim 11 wherein linear media control element is independently controllable via linear touch interaction with linear media control element.

13. The method of claim 11 wherein the media content includes video content and the linear media control element includes a scrub bar, wherein the first of the plurality of contemporaneous user touchpoints and the second of the plurality of contemporaneous user touchpoints correspond to points of the touch screen that include the video content.

14. The method of claim 13 wherein the radial distance sets an adjustment range of the scrub bar, wherein the magnitude of the adjustment range of the scrub bar is a function of the radial distance, and wherein the angular deviation sets an adjustment position of the scrub bar within the adjustment range.

15. The method of claim 10 wherein the second of the plurality of contemporaneous user touchpoints corresponds to a pivot point and the angular deviation represents a pivoting of the first of the plurality of contemporaneous user touchpoints about the pivot point.

\* \* \* \* \*